United States Patent [19]
Rohm et al.

[11] Patent Number: 6,118,368
[45] Date of Patent: Sep. 12, 2000

[54] ELECTRIC CONTROL DEVICE

[75] Inventors: Peter Rohm, Pfaffenhofen; Patrick Leteinturier, München, both of Germany; Rod Fleck, Frisco, Tex.

[73] Assignee: Siemens Aktiengesellschaft, Munich, Germany

[21] Appl. No.: 09/122,055

[22] Filed: Jul. 24, 1998

[51] Int. Cl.$^7$ .................................................. G05B 1/00
[52] U.S. Cl. ................................................... 340/146.2
[58] Field of Search ....................................... 340/146.2

[56] References Cited

U.S. PATENT DOCUMENTS 5,771,011  6/1998  Masenas ................................ 341/51

*Primary Examiner*—Margaret R. Wambach
*Attorney, Agent, or Firm*—Herbert L. Lerner; Laurence A. Greenberg; Werner H. Stemer

[57] ABSTRACT

An electric control device generates control signals that control electrical devices. The control device has a multiplicity of control modules. At least some of the control modules have a comparator for comparing two values and they function in dependence on the various outcomes of comparison. One of more global comparators are provided for certain comparisons in the control device. Each of the global comparators operates on several or all of the control modules. The control modules operate not only in dependence on the comparisons in their respective comparators, but additionally in dependence on the comparison results in the global comparator.

15 Claims, 3 Drawing Sheets

ELECTRIC CONTROL DEVICE

BACKGROUND OF THE INVENTION

1. Field of the Invention

The present invention relates to an electric control device for generating control signals for controlling electrical devices. The control device has a multiplicity of control modules, at least some of which have a comparator for comparing two values and function in dependence of the various outcomes of comparison.

Such electric control devices are known in innumerable versions and are used for the most various purposes.

The intent in most cases of the comparison, as a function of whose outcome the various control modules operate, is to detect the instant at which the counting state of a counter attains a predetermined value. In the normal case, this can be accomplished in that upon each change in the counting state of the counter, it is checked whether the new counting state is equal to the predetermined value. The matter becomes more complex if the predetermined value can vary as well. In that case, it must often additionally be possible to check whether the new value is greater-than/equal-to the current counting state. The result of this in turn is that the comparators provided in the control modules must be greater-than/equal-to comparators or less than or equal to comparators. Such comparators include many components and are correspondingly large in size, which especially if a great number of control modules that operate as a function of the comparison must be provided is a serious problem. Providing many control modules can hardly be prevented, however, because control devices of the type defined at the outset are ever more frequently capable of simultaneously generating and outputting many control signals.

SUMMARY OF THE INVENTION

It is accordingly an object of the invention to provide an electric control device, which overcomes the above-mentioned disadvantages of the prior art devices and methods of this general type and which is refined in such a way that it can be given maximum performance power at minimal effort and expense.

With the foregoing and other objects in view there is provided, in accordance with the invention, an electric control device for generating control signals controlling electrical devices, comprising:

a multiplicity of control modules;

at least some of the control modules having a comparator for comparing two values and operating in dependence of a respective outcome of a comparison in the comparator;

at least one global comparator adapted to perform certain comparisons and operating on a plurality of the control modules; and the control modules operating additionally in dependence of a respective outcome of a comparison in the global comparator.

In other words, the one or more global comparators are provided for certain comparisons and they each operate on a plurality or all of the control modules. The control modules are designed to be responsive to their own comparators and to the global comparators. As a result, the number of comparators whose practical implementations is especially complicated, i.e. in particular the number of greater than, greater-than/equal-to, less than, and/or less-than/equal-to comparators can be reduced to a minimum.

The fact that such comparators are not provided in all the control modules is no disadvantage or at least no significant disadvantage, because:

the comparisons for which the global comparators are provided (e.g. greater than, greater-than/equal-to, less than, and/or less-than/equal-to comparisons) normally need to be performed only relatively seldom; and the comparisons to be performed often (especially the comparisons for equality between two values) can be performed by the local comparators, which are still present as before, of the control modules.

Keeping the local comparators can be achieved without problems, because they need to be designed only for certain comparisons (comparisons of two values for equality) and thus can be simple and small in design.

Accordingly, in accordance with an added feature of the invention, the comparators are each adapted to compare a counting state of a counter with a defined variable.

In accordance with an additional feature of the invention, the counter or counters operate(s) on some or all of the control modules, and the global comparator is a component of the counter(s) operating on some or all of the control modules.

In accordance with another feature of the invention, the comparators in the control modules are adapted, in response to a change in the counting state to be made a basis of the comparison, to check whether the new counting state is equal to the defined variable.

In accordance with a further feature of the invention, the at least one global comparator, in response to a change in the defined variable, compares the changed value with the current counting state associated with a respective control module.

In accordance with again an added feature of the invention, the at least one global comparator is adapted to perform one of the following types of comparison: greater than, greater-than/equal-to, less than, and less-than/equal-to.

In accordance with again another feature of the invention, the control modules are substantially identical control modules.

In accordance with again an additional feature of the invention, the control modules are multifunction modules adapted to operate independently of one another selectively in one of a plurality of operating modes.

In accordance with again a further feature of the invention, the control modules are usable as comparators. They may be usable as edge detectors. In the alternative, they may be usable as capture units.

In accordance with yet a further feature of the invention, the control modules are interconnected to selectively establish cooperation between arbitrary ones of the control modules.

In accordance with a concomitant feature of the invention, a plurality of input and output terminals of the control device are provided, and the respective control modules are selectively connectible to respective input and output terminals.

The above-described electric control device can thus be given maximum performance power at minimum effort and expense.

Other features which are considered as characteristic for the invention are set forth in the appended claims.

Although the invention is illustrated and described herein as embodied in an electric control device, it is nevertheless not: intended to be limited to the details shown, since various modifications and structural changes may be made therein without departing from the spirit of the invention and within the scope and range of equivalents of the claims.

DESCRIPTION OF THE PREFERRED EMBODIMENTS

The electric control device described herein is a component of integrated circuit, for instance of a controller for the automotive and/or industrial field. However, it will be appreciated that the fields in which the invention is applicable are not restricted. Further, the control device may also be a circuit constructed with discrete elements.

In the exemplary embodiment, the control device is designed to output periodic or nonperiodic control signals via its output terminals, for controlling arbitrary electrical devices. The output control signals are in particular (but not necessarily exclusively) generated taking into account external events, or more precisely taking into account input signals that are representative of these events and are input via the input terminals of the control device.

The here-described control device is a digital control device, which is capable of detecting leading and/or trailing edges in the received signals and the instants when such edges occur. The device is also capable, in dependence on the edges, of generating individual leading or trailing edges in the control signals that are output, and/or generating and outputting periodic control signals.

It is understood that in addition or as an alternative to this, the control device may be designed to react taking into account the same or arbitrary other events or parameters as those mentioned, or to react differently.

Figure 1:
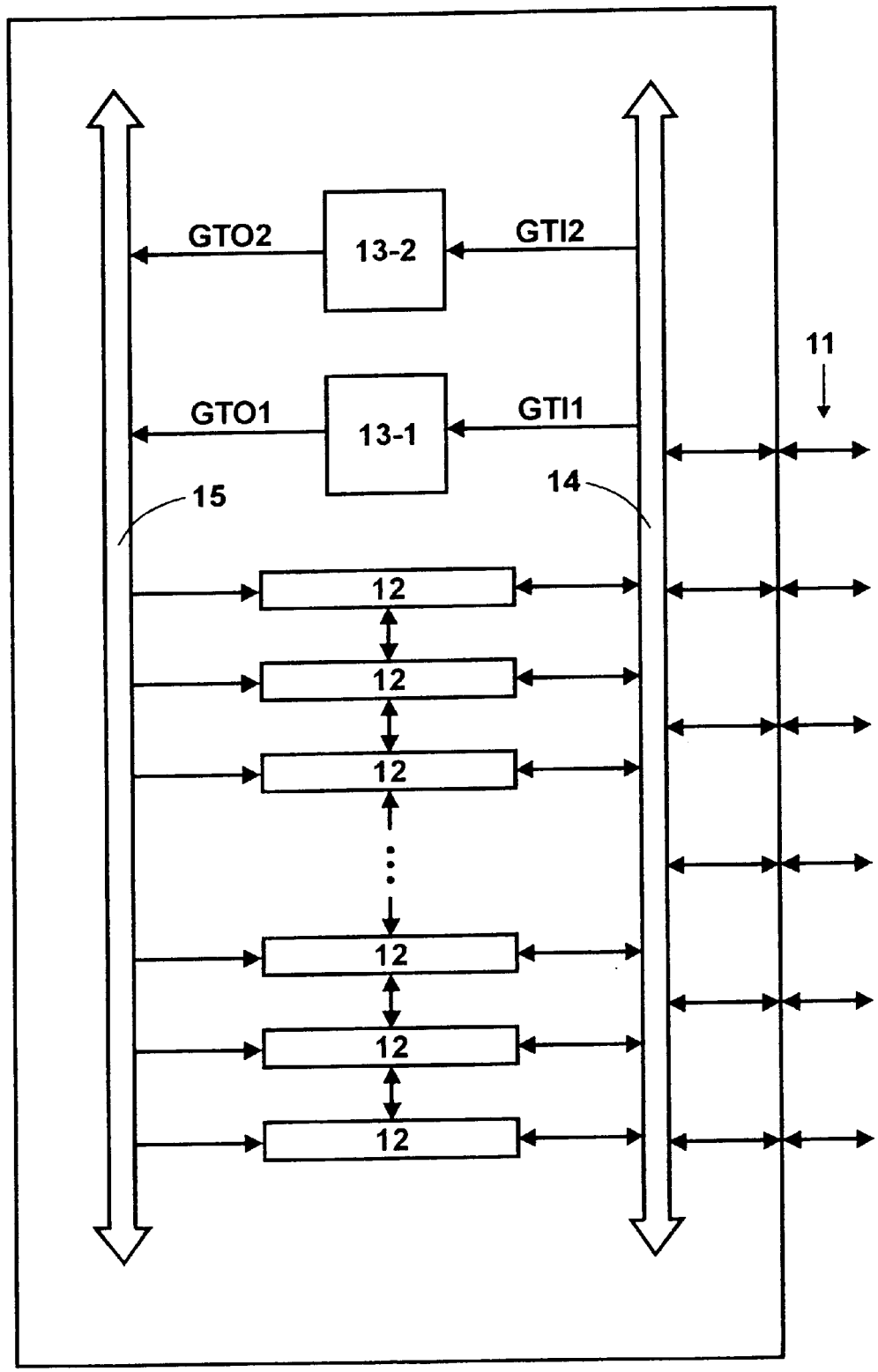
FIG. 1 is a schematic diagram of an exemplary embodiment of the control device according to the invention.

Referring now to the figures of the drawing in detail and first, particularly, to FIG. 1 thereof, there is seen a control device with many input and/or output terminals 11; a multiplicity of control modules 12 (described in further detail below); two global counters 13-1 and 13-2 (described in further detail below); a non-illustrated adjusting device; and optionally other devices as well.

It is the duty of the control modules 12 to generate control signals to be output by the control device and deliver them to the input and/or output terminals 11 of the control device; in the example in question here, each individual one of the control modules 12 is capable of doing this.

The control modules 12 in the example in question are essentially identical multifunction modules, which can be operated independently of one another, selectively in one or more operating modes.

In the illustrated example, the control modules 12 are connected to one another in series and, via a first bus 14 and a second bus 15, are connected to the input and/or output terminals 11, to the global counters 13-1 and 13-2, and to the Input/Output Routing Unit.

A fixed or a variable (adjustable or changeable) association may exist between the control modules 12 and the input and/or output terminals 11. It is not necessary for every control module to be connected to an input and/or output terminal 11, and on the other hand it may also be provided that a plurality of input and/or output terminals 11 are associated with one control module 12.

The individual control modules can be operated selectively either individually or in cooperation within groups, and the individual groups of control modules can independently of one another include any arbitrary number of control modules.

The control modules 12 operate at least partially as a function of counting states and outcomes of comparisons that are supplied to them via the second bus 15 from the global counters 13-1 and 13-2.

Between the individual control modules 12 and the global counters 13-1 and 13-2, either a fixed or a variable (adjustable or changeable) association may exist.

How the individual control modules operate, which control modules are operated cooperatively and how, which control modules are assigned to which input and/or output terminals, and which global counters are assigned to which control modules can be adjusted by the Input/Output Routing Unit.

The layout, function and mode of operation of the control modules 12 and global counters 13.1 and 13.2 will be described below in further detail in conjunction with FIGS. 2 and 3.

Figure 2:
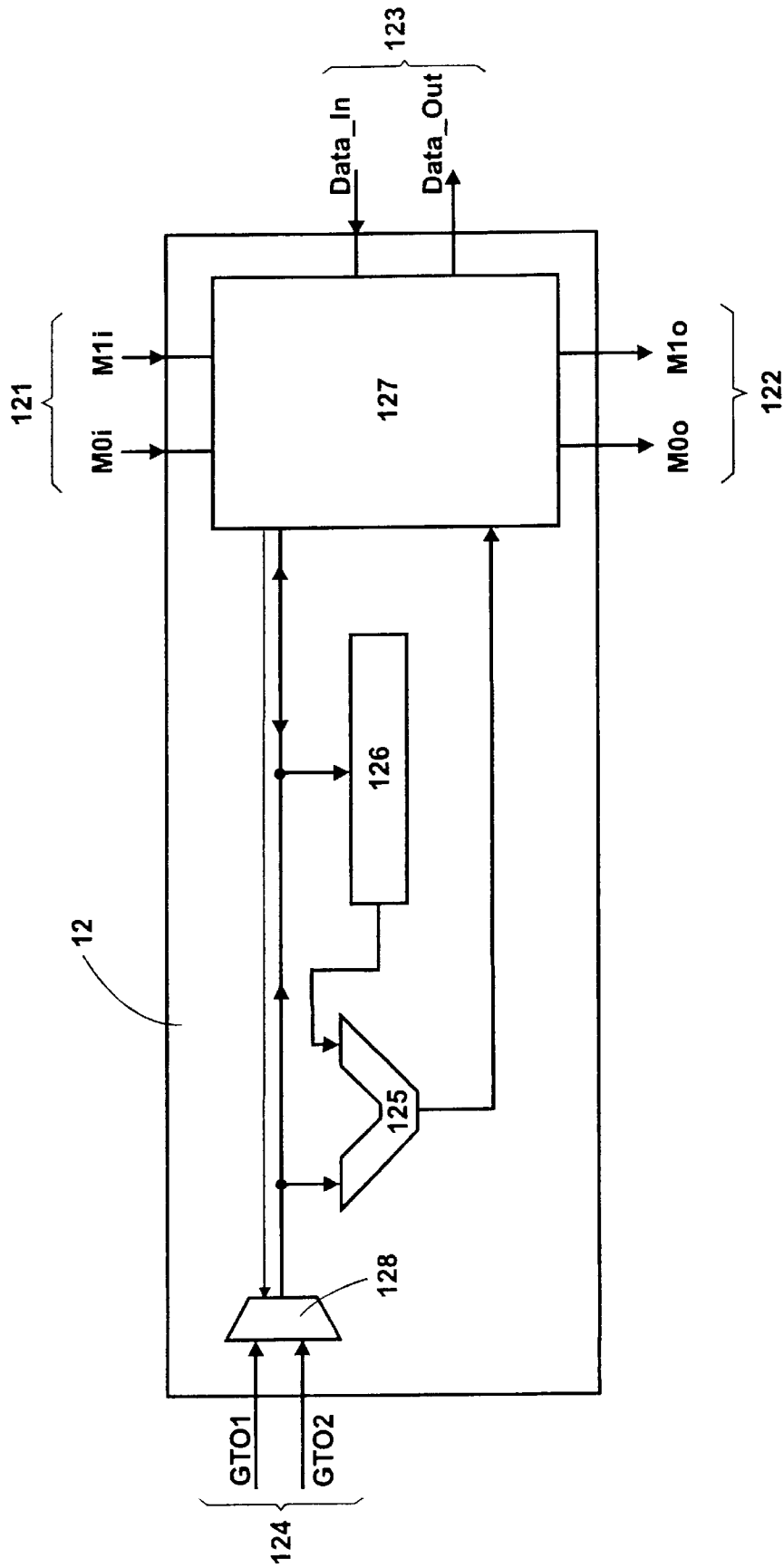
FIG. 2 is a schematic block diagram of a control module contained in the control device of FIG. 1.

Referring now more particularly to FIG. 2, there is shown an individual control module 12 which has first input and/or output terminals 121, second input and/or output terminals 122, third input and/or output terminals 123, and fourth input: and/or output terminals 124. The first input and/or output terminals 121 are used for connection with the control module disposed upstream of the respective control module in the series circuit of control modules. The second input and/or output terminals 122 are used for connection to the control module disposed downstream of the respective control module in the series circuit of control modules. The third input and/or output terminals 123 are used for the connection, made via the first bus 14, with the input and/or output terminals 11, the global counters 13-1 and 13-2, and the Input/Output Routing Unit. The fourth input and/or output terminals 124 are used for the connection, made via the second bus 15, to the global counters 13-1 and 13-2.

The first and second input and/or output terminals 121 and 122, in the example in question, include input terminals designated by the symbols M0i and M1i and output terminals designated M0o and M1o; the output terminals M0o and M1o of each control module are connected to the input terminals M0i and M1i of the next control module in succession. The third input and/or output terminals 123 in the example in question include an output terminal designated by the symbol Data_Out and an input terminal designated by the symbol Data_In. The fourth input and/or output terminals 124, in the example in question, include input terminals designated by the symbols GTO1 and GTO2. The individual input and/or output terminals, although this is not explicitly mentioned, are input and/or output terminal groups some of which comprise a plurality of input and/or output terminals.

The control modules 12 are designed to react in a predetermined way to certain internal and/or external events and to output signals or data, representing the reaction, via the second input and/or output terminals 122 and/or the third input and/or output terminals 123.

As already mentioned above, the control modules in the exemplary embodiment are multifunction modules, which can be operated in various ways depending on their being controlled by the Input/Output Routing Unit. In the special case here they can be operated selectively as edge detectors or comparators.

The control modules 12—as illustrated in FIG. 2—each include a comparator 125, a register 126, a control unit 127, and a multiplexer 128, which are connected as shown.

How the various control modules are operated, that is, whether as edge detectors or as comparators, and optionally also how the various control modules react to certain events is dictated to the various control modules by the Input/output Routing Unit, via the first bus 14 and one or more of the input terminals Data_In.

If the control module 12 is used as an edge detector, then by means of the control unit 127 the leading edge, the trailing edge, or both edges of the signal, which is supplied to the control device via the input and/or output terminal of the control device associated with the applicable control module, is detected. If an edge to be detected is detected in the aforementioned signals, then in the applicable control module, internal operations are tripped and/or signals or data representing this event are generated and output via the second input and/or output terminals 122 and/or via the third input and/or output terminals 123. The reaction to the detection of an edge may in particular comprise the storage in memory, in the register 126, of the counting state of the first global counter 13-1, supplied via the input terminal GTO1, or the counting state of the second global counter 13-1, supplied via the input terminal GTO2; this is known as the capture function. If the control modules and/or the control device are program controlled, then it may be provided additionally or as an alternative that an interrupt or other software event be tripped.

If the control module 12 is used as a comparator, then under control by the control unit 127 two values, one of which is the value stored in the register 126 and the other of which is the counting state of the first global counter 13-1, supplied via the input terminal GTO1, or the counting state of the second global counter 13-2, supplied via the input terminal GTO2, are checked for equality. If the compared values are equal or if the applicable control module is signaled, via the input terminal GTO1 or GTO2, that the counting value of the associated global counter is greater-than/equal-to the contents of the register 126, then in the applicable control module internal operations are tripped and/or signals or data representing this event are generated and output via the second input and/or output terminals 122 and/or via the third input and/or output terminals 123. If the control modules and/or the control device are program-controlled, then additionally or as an alternative it may be provided that an interrupt or other software event be tripped.

In the example in question here, the control modules behave individually as follows:

Upon the occurrence of an event to which a reaction is appropriate, as suggested above, at the associated output terminal of the control device (except in the capture function) a leading or trailing edge can be generated, or the state of the signal output via the associated output terminal of the control device can be inverted, or a suitable command can be sent to the next control module via the output terminals M0o and/or M1o.

A control module which receives this or other commands via its input terminals M0i and/or M1i, can either process them itself or pass then on to the next control module via the output terminals M0o and/or M1o.

If a control module, via its input terminals M0i and/or M1i receives a command and must simultaneously react to an event it has detected on its own, then the reaction to be performed in response to the applicable event has priority, in cases of conflict, over the execution and/or transmission onward of the command received.

As a result, an arbitrary number of control modules that react in a desired way to defined events can cooperate as desired with either unilateral or mutual influence and can be associated with certain input and/or output terminals of the control device. Such flexible configuration ability makes it possible to use the control device for the most various tasks and in the process to adapt it optimally to given conditions at minimal effort or expense.

In particular because of the fact that certain components of the control device, more specifically the counters and greater-than/equal-to comparators, can be used globally or in other words for a plurality or all of the control modules, the control device can be relatively small and simple in design. Because one or more global counters are provided and the counting states thereof are transferred to the control modules, it is in fact possible to dispense with the provision of counters in the control modules, thus reducing the number of counters to be provided to a minimum. The same is true for the provision of global greater-than/equal-to comparators, which in the present example are integrated with the global counters.

Figure 3:
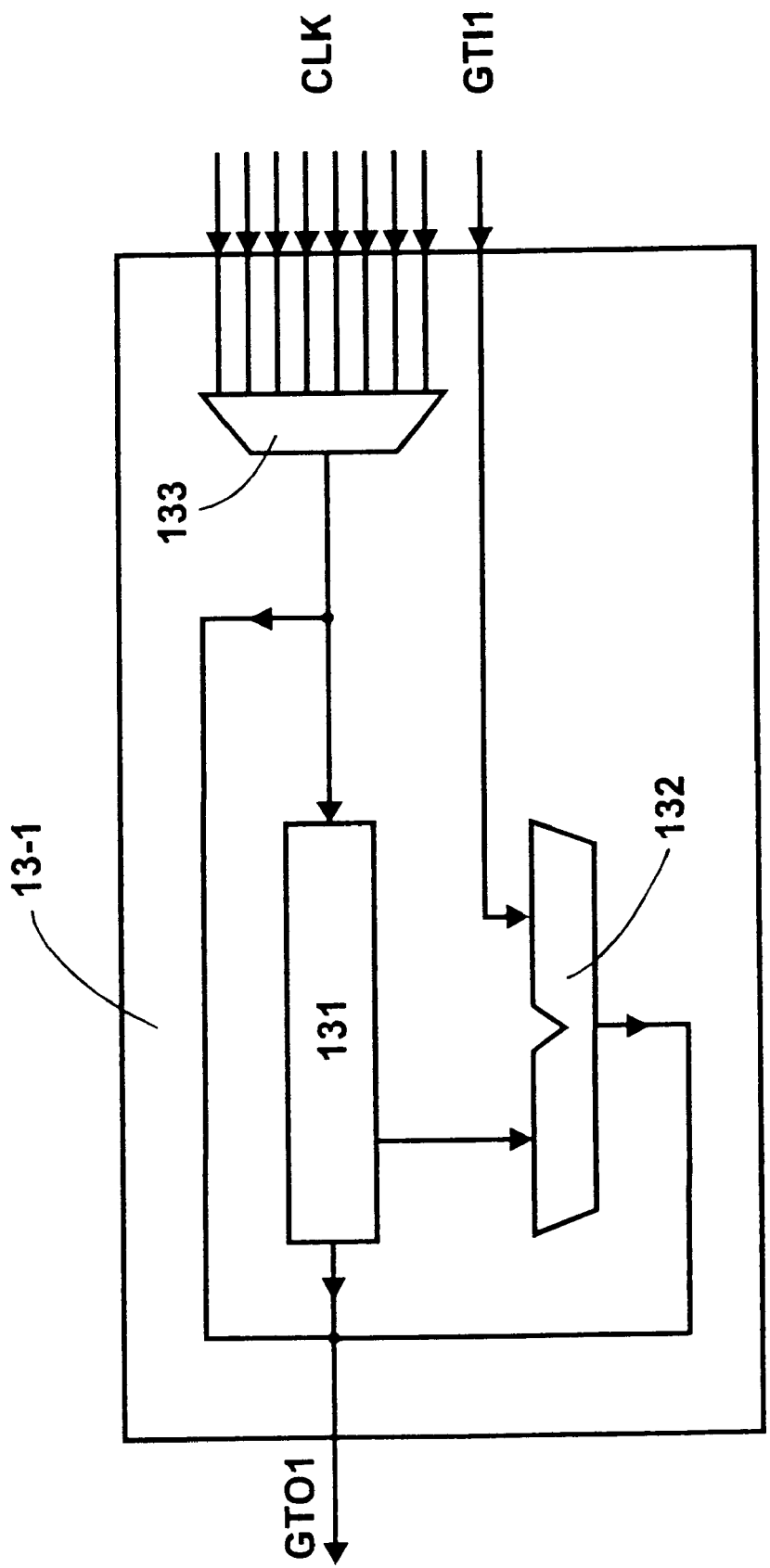
FIG. 3 is a schematic block diagram of a global counter contained in the control device of FIG. 1.

The layout of one of the global counters is shown in FIG. 3.

As seen in FIG. 3, the global counter 13-1 includes a counting unit 131, a greater-than/equal-to comparator 132, and a multiplexer 133. The global counter 13-1 is connected via input terminals GTI1 to the first bus 14, via input terminals CLK to a non-illustrated clock signal bus, and via output terminals GTO1 to the second bus 15.

By means of the multiplexer 133, one of the plurality of clock signals is selected and switched through to the counting unit 131. The counting unit 131 counts on the basis of the clock signal applied to it and outputs whatever the current counting state is to the greater-than/equal-to comparator 132 and (via the output terminal GTO1 and the second bus 15) to the control modules 12.

A non-illustrated monitoring unit monitors the data transfer that takes place via the first bus 14 and in so doing ascertains in particular whether a new value is written into one of the registers 126 of the control modules 12 operating as comparators. Writing a new value in the register 126 of the control modules 12 operating as comparators can be done only via the first bus 14. If the monitoring unit ascertains that certain data have been transmitted over the first bus 14 for writing into a register 126, then it reads these data in and delivers them to the greater-than/equal-to comparator 132. The greater-than/equal-to comparator 132 compares this value with the current counting state, also applied to it, of the counting unit 131 and outputs the outcome of comparison, via the output terminals GTO1 and the second bus 15, to the control module whose register 126 is to be written, or has been written, with new data. The applicable control module monitors the outcome of comparison supplied to it and reacts as needed in the manner described above.

By the provision of one or more global greater-than/equal-to comparators and by their use for a plurality or all of the control modules, it is possible to dispense with equipping each of the control modules with its own greater-than/equal-to comparator. This is advantageous because greater-than/equal-to comparators have a considerable size and can be realized only relatively complicatedly and expensively.

The fact that not every control module has its own greater-than/equal-to comparator is not disadvantageous, because the global greater-than/equal-to comparator or comparators never need to perform a plurality of comparisons simultaneously. After all, the greater-than/equal-to comparator is finally needed only if a register 126 of a control module used as a comparator is written with a new value, and that can after all occur only sequentially via the first bus 14. The comparisons to be performed upon changes of counting state are performed simultaneously in the various control modules by means of the comparators 125 provided in them. The comparators 125 need merely be able to check the values, to be compared, for equality. Such comparators can be made with comparatively small size and simple form and consequently can readily be provided in great numbers.

Although it is currently considered optimal to construct the control device as described, or similarly thereto, the control device can be varied in manifold respective.

For instance, it is not absolutely necessary for the control modules 12 to be substantially identical control modules. It is also possible for only some of them to be identical control modules, or each control module may be different from all the others.

If the control modules 12, as in the present case, are multifunction modules, their possible functions are not limited to comparison and edge detector functions. The control modules may be designed to take on arbitrary other functions in addition or alternatively.

The control modules need not, however, be multifunction modules whose function and cooperation can be configured individually. Instead, at least some control modules may also be used whose function and cooperation is invariably defined.

Nor need the control modules be connected in series. They may also be connected in any arbitrary order. The connections among the control modules need not be fixed connections, either. The connections between the control modules may for instance be made so that they can be configured more or less freely under the control of the Input/Output Routing Unit, as a result of which, in the ideal case, each control module can be connected in an arbitrary way to arbitrary other control modules.

It is also within the scope of this invention that the control device may be configured permanently as desired by melting or otherwise triggering suitable fuses or the like.

Moreover, it is understood that it is not necessary for the number of global counters to be precisely two. In principle, any arbitrary number of global counters can be provided, and the global counters can count independently of one another on the basis of either the same or different clock signals.

Nor is it necessary that the global comparators be accommodated in the global counters, or that the number of global comparators be equal to the number of global counters.

Nor is there any restriction requiring that the at least one global comparator be a greater-than/equal-to comparator. The at least one global comparator may in principle also be an arbitrary other kind of comparator, in particular, a greater than, smaller than, or less than or equal to comparator.

Regardless of the details of the practical implementation of the control device, the control device can be provided with maximum performance power at minimal effort and expense, as described.

We claim:

1. An electric control device for generating control signals controlling electrical devices, comprising:

a multiplicity of control modules;

a counter;

at least some of said control modules including a comparator for comparing two values and operating in dependence of a respective outcome of a comparison in said comparator, said comparator is adapted to compare a counting state of said counter with a defined variable;

at least one global comparator adapted to perform certain comparisons and operating on a plurality of said control modules; and said control modules operating additionally in dependence of a respective outcome of a comparison in said global comparator.

2. The electric control device according to claim 1, wherein said counter operates on all of said control modules.

3. The electric control device according to claim 2, wherein said global comparator is a component of said counter operating on all of said control modules.

4. The electric control device according to claim 1, wherein said counter is one of a plurality of counters each operating on a plurality of said control modules.

5. The electric control device according to claim 4, wherein said at least one global comparator is one of a plurality of global comparators each being a component of a respective said counter operating on a plurality of said control modules.

6. The electric control device according to claim 1, wherein said comparators in said control modules are adapted in response to a change in the counting state, to check whether the new counting state is equal to the defined variable.

7. The electric control device according to claim 1, wherein said at least one global comparator, in response to a change in the defined variable, compares the changed value with the current counting state associated with a respective said control module.

8. The electric control device according to claim 1, wherein said at least one global comparator is adapted to perform a comparison of a type selected from the group consisting of greater than, greater-than/equal-to, less than, and less-than/equal-to comparison.

9. The electric control device according to claim 1, wherein said control modules are substantially identical control modules.

10. The electric control device according to claim 1, wherein said control modules are multifunction modules adapted to operate independently of one another selectively in one of a plurality of operating modes.

11. The electric control device according to claim 10, wherein said control modules are usable as comparators.

12. The electric control device according to claim 11, wherein said control modules are usable as edge detectors.

13. The electric control device according to claim 11, wherein said control modules are usable for storing of the counting state supplied via said input terminal.

14. The electric control device according to claim 1, wherein said control modules are interconnected to establish cooperation between selected said control modules.

15. The electric control device according to claim 1, which further comprises a plurality of input and output terminals, and wherein respective said control modules can be selectively connected to respective said input and output terminals.

* * * * *